United States Patent
Gauthier et al.

(12) 
(10) Patent No.: US 6,313,241 B1
(45) Date of Patent: *Nov. 6, 2001

(54) NARROW MOLECULAR WEIGHT DISTRIBUTION COPOLYMERS CONTAINING LONG CHAIN BRANCHES AND PROCESS TO FORM SAME

(75) Inventors: William John Gauthier, Laurel, MD (US); Ronald Dean Moffitt, Spartanburg, SC (US); Galen Richard Hatfield, Ellicott City, MD (US)

(73) Assignee: Cryovac, Inc., Duncan, SC (US)

(*) Notice: Subject to any disclaimer, the term of this patent is extended or adjusted under 35 U.S.C. 154(b) by 46 days.

This patent is subject to a terminal disclaimer.

(21) Appl. No.: 08/941,261

(22) Filed: Oct. 1, 1997

(51) Int. Cl.$^7$ ............................ C08F 132/00; B32B 27/08
(52) U.S. Cl. ................. 526/160; 526/308; 526/348.5; 526/343; 526/345; 428/515; 428/516; 428/518
(58) Field of Search .................................... 526/160, 308, 526/348.5, 343, 345; 428/515, 516, 518

(56) References Cited

U.S. PATENT DOCUMENTS

| | | | |
|---|---|---|---|
| 3,684,782 | 8/1972 | Longi Paolo et al. | |
| 5,272,236 | 12/1993 | Lai et al. | 526/160 |
| 5,278,272 | 1/1994 | Lai et al. | 526/348.5 |
| 5,380,810 | 1/1995 | Lai et al. | 526/160 |
| 5,525,695 | 6/1996 | Lai et al. | 526/160 |
| 5,852,152 | * 12/1998 | Walton et al. | 526/348.1 |
| 5,981,676 | * 11/1999 | Gauthier et al. | 526/308 |

FOREIGN PATENT DOCUMENTS

| | | |
|---|---|---|
| 0 273654 | 7/1988 | (EP) . |
| 0 416815 | 3/1991 | (EP) . |
| 0416815 | 3/1991 | (EP) . |
| 0676421 | 10/1995 | (EP) . |
| 9308221 | 4/1993 | (WO) . |
| 97 26297 | 7/1997 | (WO) . |

OTHER PUBLICATIONS

Mani, R.: Burns, C. "Copolymerization of Ethylene and Vinylcyclohexane Using Soluble Ziegler–Natta Catalysts", Chemical Abstracts, vol. 119, No. 6, Abst. No. 49973, Aug. 1993.

Zhengtian Yu et al. "Olefin Terpolymerizations III, Symetry, Sterics, and Monomer Structures in ansa Zirconoceium Catalysts of EPDM Synthesis" J. of Polymer Science: Part A vol. 33, No. 16, pp. 2795–2801, Nov. 30, 1995.

Kaminsky et al. "Synthesis by Metallocene/MAO Catalyst and Functionalization of Poly(ethylene–co–4–vinylcyclohexene)" Polymer Bulletin, vol. 36, No. 5, pp. 577–584, May 1996.

Marques et al., "Olefin Terpolymerization II, 4–Vinylcyclohexene and cyclooctadiene", J. of Polymer Science: Part A, vol. 33, No. 6, pp. 2787–2793, Nov. 30, 1995.

* cited by examiner

*Primary Examiner*—Samuel A. Acquah
*Assistant Examiner*—Olga Asinovsky
(74) *Attorney, Agent, or Firm*—Howard Troffkin

(57) ABSTRACT

The subject invention is directed to new and novel copolymers having long chain branches formed from ethylene and at least one vinyl alicyclic monomer, to solution polymerization using certain unstrained bridged metallocene catalyst which has been found capable of forming said copolymers and to packaging material formed therefrom.

45 Claims, No Drawings

NARROW MOLECULAR WEIGHT DISTRIBUTION COPOLYMERS CONTAINING LONG CHAIN BRANCHES AND PROCESS TO FORM SAME

FIELD OF THE INVENTION

The present invention is directed to novel copolymers having long chain branch configuration and to novel process for forming same.

Polyolefins have been formed by free radical polymerization which provides a polymer product having broad molecular weight distribution and a structure which includes a significant amount of short and long chain branching. The good processability of these polyolefins has been attributed to a combination of broad molecular weight and long chain branching.

It is well known to produce polyolefins using conventional Ziegler catalysts. The resultant polymers also have broad molecular weight distribution but do not have a polymer structure which has a significant amount of long chain branches and, therefore, exhibit only average processability in providing film products.

More recently, metallocene or single site polymerization catalysts have been used to provide polyolefin products. In general, metallocene catalysts provide polymer products with narrower molecular weight distribution without a significant amount of long chain branching and, thereby, also exhibit processability problems related to melt fracture, low melt tension and the like. The metallocene complexes have been broken down into several categories based on their chemical composition and their molecular structure. For example, their organic moieties may be cyclopentadienyl (Cp) or indenyl (Ind) or fluorenyl (Flu) based. The organic groups may be unbridged or may be tied together in a bridged configuration. The bridged structure may form, with the metal atom of the complex, a strained configuration (generally referred to as constrained geometry catalyst technology or CGCT) or have a substantially unstrained configuration. The metallocene complexes of the various categories have activity in certain specific polymerization processes while being substantially non-active to other polymerization efforts.

Attempts have been made to improve the processability of polyolefins by broadening the molecular weight distribution of the polymer. One approach has involved generating a polymer product having a higher degree of long chain branching as part of the polymer's structure. U.S. Pat. Nos. 5,380,810; 5,525,695; 5,272,236 and 5,278,272 describe polymerization processes which require the use of specific constrained geometry catalyst (CGCT). It is believed that metallocene catalysts having constrained geometry can be used in solution polymerization to introduce long chain branching to polymer products formed from predominantly aliphatic alpha-olefins. The resultant polymers have enhanced processability at narrow molecular weight distributions.

More recently, EP Application 0 676 421 disclosed the ability to conduct gas phase polymerization of aliphatic alpha-olefins using certain metallocene compounds to provide products having long chain branching and, thereby, enhanced processability.

The molecular weight distribution or polydispersity of polymers is a well known variable which can be defined as the ratio of weight average molecular weight (Mw) to number average molecular weight (Mn) and is normally reported as Mw/Mn. This can be measured by gel permeation chromatography techniques. It is often convenient to gauge polymer processibility by measuring the polymer's metal flow index ratio under different loads (10 Kg and 2 Kg), as described in ASTM-D-1238. It is well known that polyethylene based resins which have narrow polydispersity (e.g., 1.5 to 3) have melt flow index ratio ($I_{10}/I_2$) of less than about 8 do not exhibit good processibility while polymers having high melt flow index ratios contain long chain branching and provide good processibility. Thus, from the melt flow ratio, one can gauge a polymer's ability to shear thin to provide a polymer with enhanced processability, e.g., low susceptibility to melt fracture surface imperfections, even under high shear stress conditions.

Copolymers formed with units derived from certain vinyl alicylic containing monomers are highly desired materials. For example, such materials have utility as a component in forming films, such as the use of copolymers of ethylene and 4-vinylcyclohexene as a cross-linking enhancer component of a multi-layer film, as described in copending U.S. Ser. No. 08/822,529 filed Mar. 24, 1997, U.S. Pat. No. 5,993,992 the teachings of which are incorporated herein by reference in its entirety. However, these alicyclic containing copolymers are difficult to process into films because of their low polydispersity and the absence of significant long chain branches in its structure.

It is highly desired and an object of the present invention to provide copolymers of ethylene and vinyl alicyclic containing monomer which have a low polydispersity while having long side chain branches and related high value of its melt flow index ratio. Such copolymers have enhanced processability and are especially useful in film forming activities.

Further, it is an object of the present invention to provide a process for catalytic polymerization of ethylene and at least one vinyl alicyclic containing comonomer by solution polymerization to provide a polymer product having good processability characteristics.

Further, it is an object of the present invention to provide process for forming films and the resultant improved film product which comprises at least one layer having the subject copolymer therein.

SUMMARY OF THE INVENTION

The present invention is directed to certain new and novel copolymers having long side chains formed from monomers of ethylene and at least one alicyclic group containing monomer represented by the formula:

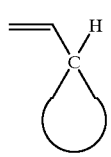

wherein

represents a (i) $C_5$–$C_{12}$ saturated alicyclic group which may be unsubstituted or substituted or (ii) $C_6$–$C_{12}$ alicyclic group which may be unsubstituted or substituted and contains at least one ethylenic carbon-carbon double bond (non-aromatic) within the ring structure.

The present invention is further directed to a solution polymerization process capable of forming the subject copolymers having long side chains using certain unstrained bridged metallocene catalysts.

DETAILED DESCRIPTION

The present invention is directed to new and novel long chain branched containing copolymers of ethylene and a vinyl alicyclic group containing comonomer represented by the formula:

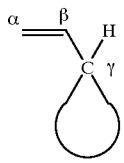   I wherein

represents an alicyclic group selected from $C_5$–$C_{12}$ saturated alicyclic group or a $C_6$–$C_{12}$ ethylenically unsaturated alicyclic group. These groups may further have one or more of its hydrogen atoms substituted by a $C_1$–$C_{12}$ hydrocarbon, as fully described below.

The subject copolymer must have ethylene as one of its monomeric forming groups. In addition, the subject copolymer must have, as one of its monomeric forming groups, at least one monomer of formula I, above. This monomer must have (i) a vinyl group; (ii) a hydrogen atom pendent from the beta carbon and the gamma carbon of the monomer I; and (iii) an alicyclic, gamma carbon atom containing group pendent from the beta carbon. The alicyclic group can be a saturated $C_5$–$C_{12}$ alicyclic group such as cyclopentyl; cyclohexyl; cyclooctyl; cyclononyl; cyclodecyl; cyclohendecyl; and cyclododecyl. These groups can be unsubstituted or can have one or more $C_1$–$C_{20}$ hydrocarbon group substitution on the alicyclic ring carbons provided the gamma carbon atom has a pendent hydrogen atom. The substitution group can be an aliphatic hydrocarbon such as, for example, methyl, ethyl, isopropyl, pentyl and the like; an alkenyl group, such as 3-butenyl, 4-hexenyl and the like, a saturated or unsaturated alicyclic group which may be fused or unfused to the alicyclic ring.

The alicyclic, gamma carbon atom containing group may, alternately, be selected from an unsaturated (non-aromatic) $C_6$–$C_{12}$ alicyclic group such as, for example, cyclohexenyl, cyclohexadienyl, cycloheptenyl, 5-cyclooctenyl, 3-cyclooctenyl, 4-cyclcooctenyl, cyclooctadienyl, cyclododecatrienyl and the like. The alicyclic groups can, besides having at least one ethylenic unsaturation within the alicyclic group, can have one or more $C_1$–$C_{20}$ hydrocarbon group substitution pendent from the alicyclic ring in the same manner as described herein above with respect to the saturated alicyclic group.

The subject copolymer may, in addition to the monomers of ethylene and monomer I described above, contain at least one additional monomer other than those defined above. For example, the additional monomer may be a $C_3$–$C_{20}$ linear or branched alpha-olefin such as propylene, 1-butene, 1-hexene, 3-methyl-1-pentene, 1-octene, 4-methyl pentene and the like; cycloolefins such as, for example, cyclopentene, norbornene, tetracyclododecene and the like; and non-conjugated dienes such as, for example, 5-ethylidene-2-norbornene, 5-vinyl-2-norbornene, 5-methylene-2-norbornene, 2,5-norbornadiene 1,3-divinylcyclohexene, 1,4-divinyl cyclohexane, 1-allyl-5-vinylcyclooctane, dicyclopentadiene and the like.

Ethylene must be a comonomer forming the subject copolymer. It can be present in from about 0.01 to about 99 molar percent of the copolymer, preferably from 25 to 99 molar percent and most preferably from 75 to 99 molar percent of the copolymer formed.

The monomer I must be a comonomer forming the subject copolymer. It can be selected from one or from a mixture (in any proportion) of more than one monomer I. It can be present in from about 1 to about 25 molar percent of the copolymer preferably from about 1 to 15 and most preferably from about 1 to 10 molar percent of the copolymer formed.

The remainder of the subject copolymer can be formed from other copolymerizable monomeric compounds, as described above.

The resulting copolymer has been found to have a narrow molecular weight distribution and long chain branches as evidenced by its low (1.5–5) polydispersity (Mw/Mn) and by its high melt flow index ratio ($I_{10}/I_2$). In general, the presence of long chain branching is indicated by the relationship of melt flow index being greater than polydispersity according to the following equation:

$$I_{10}/I_2 > Mw/Mn + 4.53$$

The present polymers have polydispersity values of at least about 1.5 to about 5 and preferably at least about 1.7 to about 4 and most preferably 1.9 to 3. In combination, in polymers of low polydispersity long chain branched structure is shown to be present by the high values of melt flow index ratio of at least about 8 and preferably 8.5, and more preferably at least about 10, as measured in accordance with ASTM D-1238.

The preferred copolymer of the instant invention is formed from the comonomers of ethylene and vinyl cyclohexene. This copolymer preferably has from about 1 to about 25 mole percent vinyl cyclohexene preferably from about 1 to 10 and most preferably from about 2 to 8 mole percent of vinyl cyclohexene.

The copolymer of the present invention is, generally, a semi-crystalline polymer although in some instances the polymer will be amorphous.

The weight average molecular weight of the subject copolymers will vary depending on the particular monomer I present, the amount of said monomer I present in the copolymer, the specific conditions (e.g., temperature, pressure, etc.) of polymerization as well as the particular catalyst used in its formation. Normally, the weight average molecular weight will range from about 10,000 to 1,000,000, with from about 25,000 to 125,000 being preferred. Altering the molecular weight can be accomplished by the utilization of hydrogen in the polymerization reaction vessel, as fully described below.

The presence of long chain branches, as a polymer structure which provides enhanced processability, may be explained by the following theory, although the theory is not meant to be a limitation on the present invention. Polymer chains exceeding a certain length or molecular weight, known as its critical entanglement molecular weight (Mc) cause the polymer molecule to overlap and have considerable entanglement when in a molten or melt state. Thus, monodispersed, linear polymer of low molecular weight (<Mc) have a zero-shear viscosity ($n_o$) which is proportional to its molecular weight while higher molecular weight polymers have zero-shear viscosity which are proportional to factor of about the 3.4 power of its molecular weight. The relaxation time ($\lambda_o$) of the polymer melt for such linear polymers follows similar proportionality. When the polymer has a branched structure, the zero-shear viscosity and relaxation time of the polymer melt is reduced when the branch chains are short and is increased exponentially when a substantial number of branches are long. This increase is believed to be due to entanglement of the long chain branches with other polymer chain segments. Thus, the observation of high average relaxation time (e.g., of greater than about 5 seconds at 180° C.) is an additional factor which provides support to the presence of long chain branches in a polymer's structure.

The presence of long chain branching in the structure of copolymers of the present invention is evidenced by NMR analysis of films of the copolymer. For example, in addition to NMR peaks normally assignable to ethylene and vinyl-cyclohexene monomer units, the NMR spectra exhibits peaks at approximately 38, 35 and 27 ppm. The 38 ppm peak is assignable to the branch connected carbon while 35 and 27 ppm peaks are assignable, respectively, to the carbons in the alpha and beta positions thereto based on literature assignments (see, for example, Randall, J. C. *J. Mater, Sci., Rev. Macromol. Chem. Phys.* 1989, C29, 201) of long chain branching in LDPE.

It has been unexpectedly found that the subject long chain branched copolymer can be formed by solution polymerization utilizing certain bridged substantially unstrained metallocene catalysts, as described below in conjunction with the specific monomers described above. The solvent forming the polymerization media can be an inert (with respect to the comonomers present) liquid hydrocarbon, which may be, for example, a $C_4$–$C_{10}$ aliphatic hydrocarbon such as, for example, isobutane, pentane, isopentane or the like or mixtures thereof; or an aromatic hydrocarbon, such as, for example, benzene, toluene, xylene or the like. Alternately, the solvent may be selected from one or more of the monomers I (preferred) or of the third monomer, if appropriate, present in excess either alone or further with an inert diluent solvent, such as those solvents described above.

The polymerization is carried out in the presence of a substantially unstrained bridged metallocene represented by the formula:

wherein $Cp^1$, $Cp^2$ each independently represents a substituted cyclopentadienyl or hydrogenated pentadienyl group, Y each independently represents a univalent anionic ligand, M represents zirconium, titanium or hafnium, and Z represents a bridging group comprising an alkylene group having 1 to 20 carbon atoms or a silyl- or germanyl-group, or phosphine or amine radical which may also be substituted. Preferred complexes are those in which M is zirconium and Z is a $C_2$ alkylene group. The preferred univalent anionic ligands are hydrogen, halide, hydrocarbyl, alkoxide, amide or phosphide and most preferably are selected from halide.

Particularly preferred metallocene complex is $C_2$-bridged substituted cyclopentadienyl-based complex represented by the formula:

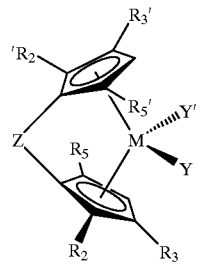

wherein Y and Y' each independently represent an anionic group, preferably hydrogen, halide (Cl, Br, I), $C_1$–$C_5$ alkoxy, $C_1$–$C_5$ amide, or phosphide and wherein M and Z are, respectively, selected from metal atoms and groups defined above. $R_3$ and $R'_3$ each independently represent a linear or branched $C_1$–$C_{20}$ hydrocarbyl or halogen substituted hydrocarbyl, a linear or branched $C_1$–$C_{20}$ alkoxy radical, a $C_3$–$C_{12}$ cyclohydrocarbyl radical or a halogen substituted cyclohydrocarbyl radical, an aryl radical, an alkaryl radical, an arylalkyl radical, a linear or branched $C_1$–$C_{20}$ hydrocarbyl radical which contains an atom or silicon, germanium, phosphorous nitrogen, boron, aluminum, or a halogen atom. The preferred groups $R_3$ and $R'_3$ are $C_1$–$C_{20}$ alkyl and most preferably $C_1$–$C_5$ alkyl groups and substituted groups of triarylsilyl, arylalkylsilyl and trialkylsilyl groups; $R_2$, $R'_2$, $R_5$ and $R'_5$ each independently represent hydrogen or an $R_3$ group; and the $R_2$ and $R_3$ pair as well as the $R'_2$ and $R'_3$ pair can each represent an unsubstituted or substituted cyclic group which may contain unsaturation to provide an aromatic or a fused aromatic ring such as, for example, indenyl, tetrahydroindenyl, benzoindenyl, naphthyl, anthracenyl, phenanchracenyl and the like.

The subject metallocene catalysts found useful in providing the subject long chain branched copolymer are $C_2$-symmetric metallocene compounds and most preferably those which are unsubstituted or substituted indenyl or tetrahydroindenyl based metallocene compounds. The preferred metal is zirconium and the bridge Z is a $C_2$ alkylene group.

Co-catalysts, usually organo-aluminum compounds such as trialkylaluminum, trialkyloxyaluminum, dialkylaluminum halides or alkylaluminum dihalides may be employed in the present invention. Especially suitable alkylaluminums are trimethylaluminum and triethylaluminum with the latter, commonly referred to as TEAL, being most preferred. Methylaluminoxane (MAO) are also usable in carrying out the methods of the present invention especially for neutral metallocene catalyst precursors. MAO may be used as a co-catalyst with metallocene catalysts in amounts well in excess of the stoichiometric equivalent amount providing mole ratios of aluminum to the coordinating metal (Me) of about 100–10,000. Modified aluminoxanes which are formed by the reaction of an isobutyl aluminum compound condensed with a methylaluminum compound are also useful co-catalysts for this invention.

While the applicant's invention is not to be restricted by theory, it is believed that neutral metallocenes of certain metals are converted to the active cationic complexes by reaction with the MAO in the manner as disclosed by Zambelli, A. et al., "Isotactic Polymerization of Propene: Homogeneous Catalysts Based on Group 4 Metallocenes Without Methylaluminoxane", Macromolecules 1989, 22, pages 2186–2189.

The catalyst precursors used in the present invention may be prepared by procedures similar to those disclosed in U.S.

Pat. No. 4,892,851, while the active cationic catalysts may be produced by simply converting the neutral metMiocene into the cationic state following procedures such as those disclosed in European applications 277,003 and 277,004 or more preferably, by reaction with triphenylcarbenium bornales. Similarly, alcohol-B(PhF$_5$)$_3$ complexes can be used as anionic precursors for forming the active cationic metallocenes of the present invention where the alcoholic proton reacts with an alkyl group on the coordinating metal atoms to generate a cationic metallocene and an alkoxide-B(PhF$_5$)$_3$ anion.

The in-situ co-catalyst may be directly mixed with the subject metallocene or, optionally, introduced on an inorganic support. Alternatively, the co-catalyst may be added to the polymerization medium along with the metallocene complex. The amount of co-catalyst mixed with the metallocene complex may be such as to provide a metal atom ratio (M) from the metallocene to the metal in the co-catalyst of 1–10,000:10,000–1 for aluminoxanes and 1–100:100–1 otherwise.

Catalyst supports may comprise a single oxide or a combination of oxides. They may also be physical mixtures of oxides. The supports may have a high surface area (250–1000 M$^2$/g) and a low pore volume (0–1 ml/g) or a low surface area (0–250 M$^2$/g) and high pore volume (1–5 ml/g) or preferably high surface area (250–1000 M$^2$/g) and high pore volume (1–5 ml/g) (mesoporous). Preferred support materials are silica, alumina, titania, boria and anhydrous magnesium chloride or mixtures thereof, although any support used in heterogeneous catalysis/polymer catalysis may be employed.

The support may undergo a pretreatment to modify its surface, e.g., thermal or chemical dehydroxylation or any combination of these, using agents such as hexamethyldisilazane and trimethylaluminum. Other reagents that can be used are triethyaluminum, methylaluminoxane and other aluminum containing alkyls, magnesium alkyls especially dibutyl magnesium and alkyl magnesium halides, zinc alkyl and lithium alkyls as well as halogenating sources. Different impregnation regimes may be used to add the surface treatment and subsequent metallocene impregnation. Metallocene or metallocene/cocatalyst may be added to the support or other supported polymerization catalyst before, during or after surface treatment to modify the support/catalyst surface of any combination of these. Impregnation may take place sequentially or in a number of separate steps or in a single step using any method known in the prior art including vapor phase treatment/impregnation techniques.

The subject long chain branched copolymer is formed by solution polymerization in the presence of the above described metallocene catalysts alone or further combined with other known polymerization catalyst such as Ziegler type catalyst or the like. It is preferred that the metallocene catalyst be the sole or major catalyst material used.

The polymerization catalyst used in the process according to the present invention may be used to produce the subject copolymers by solution polymerization techniques. Methods and apparatus for effecting such polymerization reactions are well known and described in, for example, *Encyclopaedia of Polymer Science and Engineering* published by John Wiley and Sons, 1987, Volume 7, pages 480 to 488 and 1988, Volume 12, pages 504 to 541, the teachings of which are herein incorporated in its entirety by reference. The presently required catalyst can be used in similar amounts and under similar conditions to those disclosed in the above reference.

It has been unexpectedly found that one can use the above-described class of bridged, unstrained metallocene catalysts in solution polymerization to provide long branched chain copolymers which have enhanced processability, in particular copolymers of ethylene and vinyl alicyclic group containing monomers. Further, the subject process has been found to provide an enhanced long chain branched ethylene/vinyl cyclohexene copolymers which are useful as components in film articles. The catalyst should be present in from about $10^{-10}$ to $10_{-4}$, preferably $10^{-8}$ to $10^{-4}$ mole per liter of solution.

The polymerization may, optionally, be carried out in the presence of a chain transfer agent, such as hydrogen, to control the molecular weight of the subject copolymer. It has been found that when hydrogen is used the Mw and Mn of the copolymer are reduced. The amount of hydrogen may be such that the partial pressure of hydrogen to that of the monomers in the headspace of the reactor is from about 0.01 to 200%, preferably from 0.01 to 10%.

The present solution polymerization may be carried out at temperatures of from about 0° to 250° C., preferably from about 25° to 150° C. and most preferably at from 50° to 100° C. The capability of using elevated temperatures by solution polymerization provides a means to increase the rate of reaction and the capacity for forming the subject copolymer in a commercially feasible manner.

The present solution polymerization may be carried out under a head pressure of from about 1 atmosphere to about 20 atmospheres. Low pressure of from about 1 to 20 atmospheres preferably from 1 to 10 atmospheres provides the desired long branched chain copolymer. The initial head space pressure is provided for by partial pressures of ethylene, comonomers, solvent and optionally inert gas, such as nitrogen, argon or helium.

The long chain branched copolymers of the present invention have been found to be useful in forming films or packaging material, especially in food packaging applications. The present copolymer has been found to have a high degree of processability, that is to have high zero-shear viscosity, low propensity to melt-fracture, high melt tension and a long relaxation time under melt conditions. Thus, the present copolymer can be readily processed (e.g., extruded) at high rates into films having highly desired characteristics (e.g., high clarity, reduced surface imperfections at high extrusion rates) alone or as a layer of a multi-ply film.

The present copolymer has been found to provide a film which is suitable as a packaging material. The present copolymer can be used as the sole polymeric material forming at least one layer of a film (the film may be a multilayer film having, for example, a gas barrier layer, a tack layer, etc.). Alternately, the subject copolymer can further be blended with one or more other polymers known useful as packaging film forming materials. Such polymers are thermoplastic and render the film more adaptable for use as packaging layers. Suitable polymers include, but are not limited to, polyethylene, low density polyethylene, very low density polyethylene, linear low density polyethylene, ultra-low density polyethylene, high density polyethylene, polyethylene terephthalate (PET), polyvinyl chloride, polyvinylidene dichloride and copolymers thereof as well as ethylene copolymers such as ethylene-vinyl acetate, ethylene-alkyl (meth)acrylates, ethylene-(meth)acrylic acid and ethylene-(meth)acrylic acid ionomers. In rigid articles such as beverage containers, PET is often used. Blends of different polymers may also be used. Generally, these polymers are semi-crystalline materials useful in forming packaging materials and films. The selection of the polymeric diluent largely depends on the article to be manufactured and the end use thereof. Such selection factors are well known in the art. For instance, certain polymers are known to provide adhesive, cleanliness, barrier properties, mechanical properties and/or texture to the resultant article.

Other conventional additives may also be incorporated into the copolymer or copolymer blend include, but are not necessarily limited to, fillers, pigments, dyestuffs, stabilizers, processing aids, plasticizers, fire retardants, anti-fog agents, anti-oxidants, etc. and will be used in conventional amounts.

The present copolymer has been found to provide improved packaging articles used in a variety of fields. Packaging articles come in several forms including rigid containers, flexible bags, combinations of both, etc. Typical rigid or semi-rigid articles include cartons, bottles, containers, trays, cups and the like which have wall thicknesses in the range of from about 100 to 1000 micrometers. The subject copolymer may be used as a coating which forms a part of such articles. Flexible packaging such as films, bags and the like will normally have thicknesses of from about 5 to 250 micrometers and may comprise a single or multi-layered material. A single layered article can be prepared by solvent casting or by extrusion (preferred). Multilayered articles are typically prepared using coextrusion, coating, lamination or extrusion lamination. The additional layers of a multilayered article may include "oxygen barrier" layers, i.e. those layers of material having an oxygen transmission rate equal to or less than 500 cubic centimeters per square meter per day per atmosphere (cc/($m^2 \cdot d \cdot atm$)) at room temperature, i.e. about 25° C. Typical oxygen barriers comprise poly(ethylene vinylalcohol), poly (vinylalcohol), polyacrylonitrile, polyvinyl chloride, poly (vinylidene dichloride), polyethylene terephthalate, silica, and polyamides such as Nylon 6, and Nylon 6,6. Copolymers of certain materials described above, and metal foil layers, can also be employed.

Other additional layers may include one or more layers which are permeable to oxygen. In one preferred packaging construction, especially for flexible packaging for food, the layers include, in order starting from the outside of the package to the innermost layer (that exposed to the cavity within a formed package suitable for containing a packaged material) of the package, (i) an oxygen barrier layer, (ii) a scavenging layer, and optionally, (iii) an oxygen permeable layer. Control of the oxygen barrier property of (i) allows a means to regulate the scavenging life of the package by limiting the rate of oxygen entry to the scavenging component (ii), and thus limiting the rate of consumption of scavenging capacity. Control of the oxygen permeability of layer (iii) allows a means to set an upper limit on the rate of oxygen scavenging for the overall structure independent of the composition of the scavenging component (ii). This can serve the purpose of extending the handling lifetime of the films in the presence of air prior to sealing of the package. Furthermore, layer (iii) can provide a barrier to migration of the individual components in the scavenging films or by-products of scavenging into the package interior. Even further, layer (iii) also improves the heat-salability, clarity and/or resistance to blocking (the tendency of film to cling to itself, especially during storage and handling) of the multilayer film. Thus, layer (ii) can be either directly or indirectly exposed to the cavity of the formed package.

Further additional layers such as adhesive layers may also be used. Compositions typically used for adhesive layers include anhydride functionalized polyolefins and other well-known adhesive layers.

It has further been unexpectedly found that copolymers of the present invention, more particularly copolymers having units derived from at least one vinyl unsaturated alicyclic monomer, and preferably copolymers of ethylene and vinylcyclohexene, provide an enhanced adhesive layer within a multi-layer film. For example, film layers composed of polyvinylidene chloride are known to provide a barrier property to the resultant film. However, delamination is a concern and special efforts must be applied to produce acceptable films. This concern is overcome by utilizing the present copolymer as an adjacent layer or by blending the copolymer with such difficult to adhere polymer layer material.

Films formed from the present copolymers unexpectedly have higher densities than conventional film forming ethylene/alpha-olefin copolymers (EAOC) and, thereby, can be used to impart barrier properties to a film with respect to molecules therethrough. For example, films of the present copolymer provide reduced moisture and oxygen transmission rates compared to films of EAOC having similar melt temperatures.

The copolymers of the present invention provide films having very good optics, high clarity and low haze. In addition, such copolymers have been found to be heat sealable and provide films which can be oriented and shrunk thereby are well suited for shrink film application and vacuum skin packaging.

The polymer of the present invention is easily oxidized resulting in films which could have high oxygen levels on the surface. It is anticipated that these oxidized or surface treated films will have substantially superior surface properties such as antifog properties, printability and adhesion to polar substrates. It is interesting to note that the partially oxidized EVCH copolymers displays remarkably good adhesion to metal and glass especially when hot. Such properties are useful as hot melt adhesives. Furthermore, partially oxidized EVCH copolymers of low molecular weight might serve as outstanding process aids for the extrusion of thermoplastics by virtue of increasing slip at the wall of an extruder. This could effectively be used to delay the onset of melt fracture thus allowing one to process film at a higher extrusion rate with reduced head pressure and lower energy requirements.

Like other semicrystalline polyolefin resins, EVCH is heat sealable, crosslinkable and can be oriented and shrunk. The copolymers are therefore well suited to shrink film applications and vacuum skin packaging.

The following examples are given for illustrative purposes only and are not meant to be a limitation on the invention, as defined by the claims appended to this specification. All parts and percentages are be weight unless otherwise indicated.

Experimental Procedures:

Ethylene (Air Products, CP Grade) and argon were purified by passage through columns containing molecular sieves (Davison, 3A, 4–8 mesh) and an activated copper catalyst (BASF-R3-11). 4-Vinyl-1-cyclohexene (Aldrich, 99% distilled or DuPont, 97% purity) was sparged with argon, dried over molecular sieves (Davison, 4A, 8–12 mesh) and passed through a short column containing neutral alumina immediately prior to use. raceinic-Ethylenebis (indenyl)zirconium(IV)dichloride (Catalyst A, rac-En(Ind)$_2$ZrCl$_2$), racemic-dimethylsilylbis(indenyl)zirconium(IV) dichloride (Catalyst B, rac-Me$_2$Si(Ind)$_2$ZrCl$_2$), racemic-dimethylsilylbis(2-methylindenyl)zirconium(IV)dichloride (Catalyst C, rac-Me$_2$Si(2-Me-Ind)$_2$ZrCl$_2$), and racemic-Ethylenebis(4,5,6,7-tetrahydroindenyl)zirconium(IV) dichloride (Catalyst D, rac-En(Thind)$_2$ZrCl$_2$) were purchased from Boulder Scientific and purified by recrystallization. $^1$H-NMR spectra of the various purified metallocene catalyst precursors were consistent with the literature assignments for these compounds. Poly (methylaluminoxane) (MAO, Akzo, 7.8 wt % Al in toluene) was used as received. All manipulations were carried out using syringes, shot tanks or cannulac techniques to exclude air and moisture. Catalysts and MAO were stored and transferred in an oxygen- and moisture-free glove box.

The reactor used for the polymerizations was a 2 L stainless steel jacketed autoclave (Zipperclave by Autoclave Engineers') equipped with a overhead Magnedrive and a helical impeller at 400 rpm. Temperature control was maintained using an external recirculating bath (NesLab RTE-100). Head pressure and ethylene flow rate were measured and controlled using a calibrated mass flow controller. Agitation rate was typically within 25 rpm of set value whereas temperature and pressure were maintained to within 1° C. and 1 psig respectively.

Density (±0.005 g/cm$^3$) was estimated from either the melt strand from the melt flow indexer (MFI, strand density) or by melt pressing a thick film (10–30 mil). Density measurements were conducted on an analytical balance using a density adapter with absolute ethanol as the liquid phase.

Differential scanning calorimetry was conducted on a TA Instruments DSC 2920 or a Perkin-Elmer DSC-7 at a heating/cooling rate of 10° C./min and the instruments were calibrated with a NIST indium standard.

$^{13}$C NMR analyses were measured using a Bruker DMX-400 MHz NMR spectrometer, proton decoupled with benzene-d$_6$ as an internal lock at 120° C. in 1,2,4-trichlorobenzene.

Molecular weight and molecular weight distributions were measured using a Waters 150 CV gel permeation chromatograph at 150° C. in trichlorobenzene that was calibrated using narrow molecular weight distribution polystyrene standards. The molecular weight distribution, and the statistical moments ($M_n$, $M_w$, $M_z$ etc.) thereof were determined using the universal calibration method.

Melt flow index was measured using a CSI MFI-2 at 190° C. and 2.16 kg ($I_2$) or 10 kg ($I_{10}$) weights according to ASTM D 1238.

Material reponses to temperature and shear were conducted in the following manner:

Resin discs, 50 mm in diameter, and approximately 3 mm thick were prepared by compression molding the resin pellets of each sample at 160° C. and 550 psig for five minutes. The discs were then allowed to cool to room temperature. Discs free of included air bubbles were easily produced with the subject resins and the above molding conditions.

Each disc was placed between the plates of a 50 mm diameter parallel plate fixture of the Rhiieometrics RMS-800 Mechanical Spectrometer and the plate spacing was adjusted to 1.500 mm. Any rejected melt squeezed beyond the plate edge during the gap adjustment was removed with a spatula. A dynamic strain of 5 percent was imposed on the sample as the frequency of oscillation was varied from 10$^{-2}$ rad/sec to 10$^2$ rad/sec at logarithmically-spaced intervals of two points per decade. Frequency sweeps were performed at each of three melt temperatures spaced at 20° C. intervals from 180° C. to 140° C., to minimize sample thermal degradation, and to facilitate the construction of a shear viscosity master curve. The parallel plate fixture was initially zeroed at 180° C., and a thermal expansion coefficient of 2.5 mm/° C. was specified to account for the change in the plate spacing of the parallel plate fixture with temperature, as recommended by Rheometrics Scientific, Inc. This procedure is in compliance with ASTM D 4440.

The data for the complex shear viscosity ($\eta^*$), and the loss (G") and storage moduli (G') in shear obtained from frequency sweeps at the three melt temperatures were collapsed into a master curve by referencing each frequency sweep through time-temperature superposition to the data obtained at 180° C. Time-temperature superposition was accomplished using Rhios Version 4.2.2 rheological analysis software operating in the horizontal shift mode. An Arrhenius fit of the resulting shift factors for each melt temperature provided an estimate of the flow activation energy. A discrete relaxation spectrum for the master curve was determined from a non-linear least-squares fit of G', G" data assuming approximately two relaxation times and moduli per each decade of angular frequency, $\omega$. The plateau modulus, $G^0_N$, was estimated from the intercept of a non-linear least-squares fit of the G' master curve for frequencies greater than or equal to 1 rad/sec, according to the following model equation:

$$G'(\omega) = G^0_N + \frac{c}{\omega^d}$$

where c and d are constants obtained from the nonlinear regression analysis.

Complex shear viscosity master curves were modeled by a non-linear least-squares regression fit to the Cross Model equation:

$$\eta^*(\omega) = \frac{\eta_0}{[1 + (\lambda_0 \omega)^b]}$$

where $\eta_0$ is the zero-shear viscosity, $\lambda_0$ is the average relaxation time of the melt, and b is the Cross Model exponent, related to the degree of shear thinning in the melt.

EXAMPLE I

Ethylene-4-vinylcyclohexene (E-VCH) Copolymerization in Solution

4-Vinyl-1-cyclohexene solution (3 M in toluene) was transferred to a 2 L Zipperclave reactor and 3.8 mL of MAO (7.8 wt % Al in toluene) was injected using a syringe. The solution was allowed to equilibrate at 50° C. over a head pressure of 5 psig ethylene and 2 mg of rac-En(Ind)$_2$ZrCl$_2$ (Catalyst A, dissolved in 20 mL dry, degassed toluene) was injected into the reactor. The polymerization was allowed to proceed with ethylene fed on demand to maintain reactor pressure. After 2.8 h, the contents of the reactor were discharged into methanol, agitated, filtered and dried in vacuo. The amorphous polymer (155 g) had a melt flow index (2.16 kg, 190° C.) of 1.7 dg/min and an $I_{10}/I_2$ of 13.3 with a molecular weight (by GPC): $M_w$=90,700 g/mol and polydispersity index PDI~2.7. This example demonstrates that substantially amorphous ethylene copolymers can be prepared containing long chain branching.

EXAMPLE II

Ethylene-4-Vinylcyclohexene Copolymerization

To a dry, deoxygenated 2 L Zipperclave autoclave was added 900 g of a 3.0 M solution of VCH in toluene. MAO (1.8 mL of a 7.8 wt % Al in toluene solution) was injected into the reactor using a syringe and the reactor was heated to 75° C. The solution was saturated at 15 psig ethylene and the polymerization was commenced by injection of 1 mg of catalyst A dissolved in 5 mL of toluene. The polymerization was monitored and the polymer solution was periodically withdrawn from the reactor through a ball valve connected to the bottom of the reactor. Aliquots were removed from the reactor after 15, 40, 60 and 65 minutes. The polymer solution aliquots were precipitated into methanol, filtered and dried in a vacuum oven. A total of 120 g of polymer was collected. The melting temperature (0° C.) and the melt index of the aliquots are shown in Table 1. This indicates a feature of the invention in which the extent of long chain branching as evidenced by the increase in $I_{10}/I_2$ increases as the polymerization proceeds. The increase in $I_{10}/I_2$ is accompanied by a decrease in the melt flow index ($I_2$).

TABLE 1

Effect of Polymerization Time on the Melt Flow Properties of E-VCH.

| Time (min) | Melting Temperature (° C.) | $I_2$ | $I_{10}/I_2$ |
|---|---|---|---|
| 15 | 99.0 | 3.52 | 8.2 |
| 40 | 96.6 | 0.49 | 13.6 |
| 60 | 95.4 | 0.15 | 16.7 |
| 65 | 93.3 | 0.08 | 19.8 |

EXAMPLE III

Ethylene-4-Vinylcyclohexene Copolymerization

A polymerization was carried out according to Example I except that 866 g of VCH/(3 M in toluene) was used and samples were taken from the reactor after 15, 32 and 52 min the results of which are shown in Table 2. Aliquots (~50 mL) of the polymer were discharged in these cases into a flask containing hindered phenolic stabilizing (Irganox 1076 and Irgafos 168) dissolved in toluene. The volatiles were removed using a vacuum oven. To the remaining polymer solution in the reactor, 4 fractions (based on polymer weight) were collected with increasing levels of Irganox 1076 added (406, 875, 1360 and 2000 ppm). A total of 123 g of polymer was isolated. The results are summarized in Table 3.

TABLE 2

Effect of Polymerization Time on the Melt Flow Properties of E-VCH.

| Time (min) | Melting Temperature (° C.) | $I_2$ | $I_{10}/I_2$ |
|---|---|---|---|
| 15 | 91.9 | 2.65 | 9.67 |
| 32 | 89.3 | 0.59 | 13.37 |
| 52 | 87.7 | 0.12 | 18.4 |

TABLE 3

Effect of Antioxidant Level on the Melt Flow Properties of E-VCH.

| Level of Irganox 1076 | $I_2$ | $I_{10}/I_2$ |
|---|---|---|
| 406 | 0.028 | 22.8 |
| 875 | 0.055 | 21.6 |
| 1360 | 0.056 | 21.7 |
| 2000 | 0.058 | 21.6 |

These examples demonstrate that the increase in $I_{10}/I_2$ occurs in the reactor and that the polymer can be stabilized by addition of a conventional stabilizer, such as Irganox 1076. This demonstrates that hydrogen can be used as a polymer molecular weight modifier while still obtaining higher than expected $I_{10}/I_2$ ratios.

EXAMPLE IV

Ethylene-4-Vinylcyclohexene Copolymerization

A polymerization was carried out according to Example 1 except that 862 g of VCH/(3 M in toluene) was used, 0.0123 moles of hydrogen was added and samples were taken from the reactor after 17, 32 and 60 min. The polymer was discharged in these cases into flasks containing a small amount of Irganox 1076 and Irgafos 168. The volatiles were removed using a rotary evaporator with subsequent drying in a vacuum oven. The results are summarized in Table 4. The final polymer 130 g was stabilized with 770 ppm Irganox 1076 and 380 ppm Irgafos 168.

TABLE 4

Effect of Polymerization Time on the Melt Flow Properties of E-VCH.

| Time (min) | Melting Temperature (° C.) | $I_2$ | $I_{10}/I_2$ |
|---|---|---|---|
| 17 | 94.5 | 75.0 | nd |
| 32 | 93.3 | 19.4 | nd |
| 60 | 89.7 | 2.2 | 11.7 |

These examples demonstrate that the increase in $I_{10}/I_2$ is occuring in the reactor and not due to some post-reactor crosslinking. This example further demonstrates that hydrogen can be used as a polymer molecular weight modifier while still abtaining higher than expected $I_{10}/I_2$ ratios.

EXAMPLE V

Ethylene-4-Vinylcyclohexene Copolymerization

A polymerization was carried out according to example 1. To a 2 L Zipperclave reactor was added 798 g of VCH solution (3 M in toluene) and 1.2 mL of MAO solution (10.3 wt % Al in toluene). The solution was heated to 75° C. and saturated to 15 psig ethylene. Racemic-dimethylsilylbis (indenyl) zirconium(IV)dichloride (Catalyst B, 1 mg) was dissolved in 5 mL of toluene and injected into the reactor using a syringe. The polymerization was allowed to proceed for 60 min and samples were withdrawn from the reactor after 15 min and 40 min. The polymer (a total of 106 g) was precipitated into methanol, filtered and dried as described above. The resultant polymer exhibited a broad melting endotherm from 40–120° C. and had the following melt flow properties (Table 5).

TABLE 5

Effect of Polymerization Time on the Melt Flow Properties.

| Time (min) | Melting Temperature (° C.) | $I_2$ | $I_{10}/I_2$ |
|---|---|---|---|
| 15 | 82.7 | 75.0 | 14.1 |
| 40 | 80.0 | 19.4 | 19.2 |
| 60 | 76.9 | 2.2 | 33.1 |

This example demonstrates that the formation of LCB is not unique to Catalyst A but rather is a general feature of solution polymerization using bridged, indenyl-based $C_2$-symmetric metallocenes.

EXAMPLE VI

Ethylene-4-Vinylcyclolhexene Copolymerization

A polymerization was carried out according to Example 1. To a 2 L Zipperclave reactor was added 858 g of VCH solution (3 M in toluene) and 2.5 mL of MAO solution (10.3 wt % Al in toluene). The solution was heated to 50° C. and saturated to 15 psig ethylene. Racemic-dimethylsilylbis(2-Me-1-indenyl)zirconium(IV)dichloride (Catalyst C, 1 mg) was dissolved in 5 mL of toluene and injected into the reactor using a syringe. The polymerization was allowed to proceed for 60 min and samples were withdrawn from the reactor after 21 min and 40 min. The polymer (about 60 g) was precipitated into methanol, filtered and dried as described above. The resultant polymer exhibited a melting temperature of 80.8° C. and had the following melt flow properties (Table 6).

TABLE 6

Effect of Polymerization Time on the Melt Flow Properties.

| Time (min) | Melting Temperature (° C.) | $I_2$ | $I_{10}/I_2$ |
|---|---|---|---|
| 21 | nd | 0.05 | 9.6 |
| 40 | nd | 0.021 | 11.9 |
| 60 | 80.8 | 0.007 | 18.2 |

This example further demonstrates that the formation of LCB is not unique to Catalyst A but rather is a general feature of solution polymerization using substituted indenyl-based $C_2$-symmetric metallocenes.

EXAMPLE VII

Ethylene-4-Vinylcyclohexene Copolymerization

A polymerization was conducted according to Example 1 except that the polymerization was done at 50° C., 7 psig ethylene in 824 g of 3 M VCH in toluene using 2 mL of MAO solution (9.6 wt % Al in toluene) and 1.5 mg of racemic-ethylenebis(tetrahydroindenyl)zirconium(IV) dichloride (Catalyst D). The polymerziation was allowed to proceed for 3 h and 68 g of polymer was isolated. The resultant E-VCH copolymer had a melting temperature of 107° C. and an $I_2$ of 1.8 dg/min with a melt flow ratio ($I_{10}/I_2$) of 8.5. This example demonstrates that other isospecific catalysts described in the present application can be used to prepare long chain branched copolymers of the present invention.

EXAMPLE VIII

Ethylene-4-Vinylcyclohexene Copolymerization

A polymerization was conducted according to Example 1 except that the polymerization was done at 50° C., 4 psig ethylene in 850 g of 3 M VCH in toluene using 4.7 mL of MAO solution (9.6 wt % Al in toluene) and 3 mg of racemic-ethylenebis(tetrahydroindenyl)zirconium(IV) dichloride. The polymerziation was allowed to proceed for 90 min and 117 g of polymer was isolated. The resultant E-VCH copolymer had a melting temperature of 99° C. and an $I_2$ of 0.40 dg/min with a melt flow ratio ($I_{10}/I_2$) of 20.5. The weight average molecular weight was 80,300 g/mol with a PDI of 1.9 (both by GPC). This example further demonstrates that other isospecific catalysts can be used to prepare long chain branched copolymers and that high $I_{10}/I_2$ ratios are obtained with low polydispersity values.

EXAMPLE IX

Preparation of High Melting Ethylene-4-Vinylcyclohexene Copolymer

A polymerization was conducted according to Example 1 except that the polymerization was done at 50° C., 50 psig ethylene in 868 g of 2.2 M VCH in toluene using 2.8 mL of MAO solution (7.8 wt % Al in toluene) and 0.5 mg of racemic-ethylenebis(indenyl)zirconium(IV)dichloride. The polymerziation was allowed to proceed for 54 min and 58 g of polymer was isolated. The resultant E-VCH copolymer had a melting temperature of 121° C. and an $I_2$ of 0.03 dg/min with a melt flow ratio ($I_{10}/I_2$) of 31.5. The copolymer was found to contain 1 mole % VCH (by $^{13}C$ NMR), the weight average molecular weight was 107,000 g/mol with a PDI of 2.3 (both by GPC). This example demonstrates that higher melting copolymers can be prepared containing long chain branching.

EXAMPLE X

Preparation of High Melting Ethylene-4-Vinylcyclohexene Copolymer

A polymerization was conducted according to Example 1 except that the polymerization was done at 50° C., 50 psig ethylene in 870 g of 2.2 M VCH in toluene using 2.8 mL of MAO solution (7.8 wt % Al in toluene) and 0.5 mg of racemic-ethylenebis(indenyl)zirconium(IV)dichloride (Catalyst A). The polymerziation was allowed to proceed for 17 min and 37 g of polymer was isolated. The resultant E-VCH copolymer had a melting temperature of 119° C. and an 12 of 0.09 dg/min with a melt flow ratio ($I_{10}/I_2$) of 17.9. The copolymer was found to contain 1.1 mole % VCH (by $^{13}C$ NMR), the weight average molecular weight was 105,000 g/mol with a PDI of 2.2 (both by GPC). This example further demonstrates that higher melting copolymers can be prepared containing long chain branching.

EXAMPLE XI

Preparation of High Melting Ethylene-4-Vinylcyclohexene Copolymer

A polymerization was conducted according to Example 1 except that the polymerization was done at 50° C., 50 psig ethylene in 880 g of 2.2 M VCH in toluene using 2.8 mL of MAO solution (7.8 wt % Al in toluene) and 0.5 mg of racemic-ethylenebis(indenyl)zirconium(IV)dichloride (Catalyst A). Hydrogen (0.01106 moles) was added. The polymerziation was allowed to proceed for 33 min and 56 g of polymer was isolated. The resultant E-VCH copolymer had a melting temperature of 120° C. and an $I_2$ of 0.22 dg/min with a melt flow ratio ($I_{10}/I_2$) of 15.5. The copolymer was found to contain 1 mole % VCH (by $^{13}C$ NMR), the weight average molecular weight was 88,000 g/mol with a PDI of 2.1 (both by GPC). This example demonstrates that higher melting copolymers can be prepared containing long chain branching and hydrogen can be added to modify polymer molecular weight.

EXAMPLE XII

Preparation of Amorphous Ethylene-4-Vinylcyclohexene Copolymer

A polymerization was conducted according to Example 1 except that the polymerization was done at 50° C., 5 psig ethylene in 834 g of VCH using 3.8 mL of MAO solution (7.8 wt % Al in toluene) and 2 mg of racemic-ethylenebis (indenyl)zirconium(IV)dichloride. The polymerziation was allowed to proceed for 125 min and 63 g of amorphous polymer was isolated. The resultant E-VCH copolymer had a $I_2$ of 6.5 dg/min with a melt flow ratio ($I_{10}/I_2$) of 8.9. The copolymer was found to contain 15.7 mole % VCH (by $^{13}C$ NMR), the weight average molecular weight was 62,000 g/mol with a PDI of 2.0 (both by GPC). This example demonstrates that substantially amorphous copolymers containing long chain branching can also be prepared by this process.

EXAMPLE XIII

Preparation of Amorphous Ethylene-4-Vinylcyclohexene Copolymer

A polymerization was conducted according to Example 1 except that the polymerization was done at 50° C., 5 psig ethylene in 846 g of VCH using 3.8 mL of MAO solution (7.8 wt % Al in toluene) and 2 mg of racemic-ethylenebis (indenyl)zirconium(IV)dichloride (Catalyst A). The polymerization was allowed to proceed for 165 min and 174 g of amorphous polymer was isolated. The resultant E-VCH copolymer had a $I_2$ of 1.71 dg/min with a melt flow ratio ($I_{10}/I_2$) of 11.3. The copolymer was found to contain 18.1 mole % VCH (by $^{13}C$ NMR), the weight average molecular weight was 91,000 g/mol with a PDI of 2.6 (both by GPC). This example demonstrates that substantially amorphous copolymers containing higher levels of long chain branching can be prepared.

EXAMPLE XIV

Ethylene-4-Vinylcyclohexene Copolymerization

A polymerization was conducted according to Example 1 except that the polymerization was done at 50° C., 5 psig ethylene in 830 g of VCH using 3.8 mL of MAO solution (7.8 wt % Al in toluene) and 2 mg of racemic-ethylenebis (indenyl)zirconium(IV)dichloride. The polymerization was sampled after 33, 67 and 133 min. and the molecular weight of the fractions were measured. The polymerziation was allowed to proceed for 200 min and 125 g of amorphous polymer was isolated. The resultant E-VCH copolymer had a $I_2$ of 1.22 dg/min with a melt flow ratio ($I_{10}/I_2$) of 11.2. The final copolymer was found to contain 15.9 mole % VCH (by $^{13}C$ NMR), the weight average molecular weight was 86,000 g/mol with a PDI of 2.6 (both by GPC). The sampling results are shown below in Table 7. This example demonstrates that substantially amorphous ethylene copolymers can be prepared with very high levels of long chain branching and that the molecular weight of the polymer is increasing during the polymerization.

TABLE 7

Effect of Polymerization Time on the Melt Flow Properties in Example 14.

| Polymerization Time (min) | Mole % VCH in Copolymer | $M_w$ (g/mol) | PDI |
|---|---|---|---|
| 33 | 14.9 | 56,500 | 1.9 |
| 67 | 15.1 | 62,600 | 2.1 |
| 133 | 16.6 | 72,500 | 2.3 |
| 200 | 15.9 | 86,300 | 2.6 |

EXAMPLE XV

Ethylene-4-Vinylcyclohexene Copolymerization

A polymerization was conducted according to Example 1 except that the polymerization was done at 50° C., 5 psig ethylene using 53.1 g of VCH, 512 g of toluene containing 0.1 wt % Al (MAO), a small amount of hydrogen (40 mL sample cylinder containing 50 psig) and 2.2 mg of racemic-ethylenebis(indenyl)zirconium(IV)dichloride (Catalyst A). The polymerization was allowed to proceed for 70 min and 110 g of semicrystalline polymer was isolated. The resultant E-VCH copolymer had a 12 of 1.18 dg/min with a melt flow ratio ($I_{10}/I_2$) of 15.4. The copolymer had a melting temperature of 103.5° C. and the VCH content was estimated (based on its melting temperature) to contain 4.3 mole % VCH and the weight average molecular weight was 60,100 g/mol with a PDI of 2.4 (both by GPC).

EXAMPLE XVI

Ethylene-4-Vinylcyclohexene Copolymerization

A polymerization was conducted according to Example 1 except that the polymerization was done at a higher polymerization temperature of 75° C., 10 psig ethylene using 211 g of VCH, 876 g of toluene containing 0.075 wt % Al (MAO) and 1 mg of racemic-ethylenebis(indenyl)zirconium (IV)dichloride (Catalyst A). The polymerization was allowed to proceed for 70 min and 158 g of semicrystalline polymer was isolated. The resultant E-VCH copolymer had a $I_2$ of 1.13 dg/min with a melt flow ratio ($I_{10}/I_2$) of 12.9. The copolymer had a melting temperature of 94.1° C. and the VCH content was estimated (based on its melting temperature) to contain 5.9 mole % VCH.

EXAMPLE XVII

Ethylene-4-Vinylcyclohexene Copolymerization

A polymerization was conducted according to Example 1 except that the polymerization was done at 75° C., 10 psig ethylene using 409 g of VCH, 670 g of toluene containing 0.075 wt % Al (MAO) and 3 mg of racemic-ethylenebis (indenyl)zirconium(IV)dichloride (Catalyst A). The polymerization was allowed to proceed for 110 min and 184 g of semicrystalline polymer was isolated. The resultant E-VCH copolymer had a $I_2$ of 4.53 dg/min with a melt flow ratio ($I_{10}/I_2$) of 10.7. The copolymer had a melting temperature of 81.6° C. and the VCH content was estimated (based on its melting temperature) to contain 7.8 mole % VCH.

EXAMPLE XVIII

Ethylene-4-Vinylcyclohexene Copolymerization

A polymerization was conducted in a 30 L jacketed Meyers Mixer equipped with a wall wiper (70 rpm) and a high speed mixer (3000 rpm). The polymerization was conducted at 70° C. (+3° C.) and 25 psig ethylene using 17.1 kg of VCH and about 46 g of MAO solution (10 wt % Al in toluene). The polymerization was commenced by injection of Catalyst D (10 mg). The polymerization was allowed to proceed for 30 minutes with an average ethylene uptake of 40 standard liters per minute. The total ethylene uptake was 1217 standard liters and the total polymer yield was estimated to be about 1500 g. The polymerization was terminated by venting the reactor quickly, injection of 3 mL of a methanol/water (~4:1) mixture and stabilized with 2.5 g of Irganox 1076. An aliquot of the polymer solution was evaporated to dryness and the resultant polymer was found to have a melting temperature of 87.5° C., an $I_2$ of 2.46 and an $I_{10}/I_2$ of about 8. The weight average molecular weight was found to be 69,500 and the PDI was 1.9 by GPC.

EXAMPLE XIX

A comparative copolymerization of two alpha-olefins were conducted according to Example I. The resultant copolymer did not have the desired properties.

To a 2 L Zipperclave reactor was charged 48 g of dry, distilled 1-hexene and 750 g of toluene solution containing 0.075 wt % Al. The solution was heated to 75° C. and saturated at 50 psig and ethylene was fed in on demand. Racemic-ethylenebis(indenyl)$_2$ZrCl$_2$ (0.03 mg) was injected into the reactor and the polymerization was allowed to proceed for 75 min. Aliquots were removed from the reactor after 12 min, 43 min and 65 min respectively. After 75 min the contents of the reactor was discharged into methanol, agitated, filtered and dried. The final E-H copolymer (84.5 g) had a melting temperature of 107.7° C. and an 12 of 2.9 dg/min and an I$_{10}$/I$_2$ of 7.3 which is consistent with a linear polymer substantially void of long chain branches. Furthermore the I$_2$ and I$_{10}$/I$_2$ ratio did not change substantially during the course of the polymerization as evidenced by similar I$_2$ and I$_{10}$/I$_2$ values. This example clearly shows that certain monomers such as (I) in combination with certain catalysts have an improved ability according to the present process to form long chain branches compared to α-olefins.

EXAMPLE XX

60/40 Blends of Ethylene-Vinylcyclohexene Copolymers With Thermoplastic Resins In a series of runs, E-VCH copolymer (24 g, 60%, of Example XVIII) was added to the Brabender mixing chamber at 130° C. under a nitrogen purge. A second resin of the blend (16 g, 40%) was added to the chamber as indicated in the Table below. In some cases, noted below, the temperature was slightly increased to accomodate the melting temperature of the particular polymer. All samples were mixed for 30 minutes with a constant nitrogen purge. Samples were removed from the mixer, hot, and pressed into sheet. A small sample was then cut from the sheet and pressed at 140° C. for approximately 1 minute to yield a "thin" (5–11 mils) film for optical measurements. Optical measurements were conducted on a Haze-Gard Plus and gloss was measured at 45° using a Micro-gloss meter (both by BYK Gardner). Five different blends were prepared at a 60/40 ratio: low-density polyethylene (LDPE), linear low-density polyethylene (LLDPE), ethylene-vinylacetate copolymer (E-VA), ethylene-propylene copolymer (EPC) and ethylene-butylacrylate copolymer (E-BA). Preferred blends are those with good optics which can be defined as high transmittance, clarity and gloss with low haze values. The copolymer of the present invention has been found to produce good optical quality blends with LDPE, LLDPE, and EPC, the various resins used here which are typically those used in film forming activities.

|   | Resin | Tradename | Supplier | Density (g/cc) | MFI (dg/min) |
|---|---|---|---|---|---|
|   | E-VCH | — | — | 0.93 | 2.5 |
| A | LDPE | POLY-ETH 1017 | Chevron | 0.918 | 7.0 |
| B | LLDPE | Dowlex 2037 | Dow | 0.935 | 2.5 |
| C | E-VA | LD-318.92 | Exxon | 0.930 | 2.0 |
| D | EPC | PD 9302 | Exxon | — | 4.0 |
| E | E-BA | Lotryl EBA-18 | Elf Atochem | — | — |

TABLE 8

| Blend | Temp (° C.) | Thickness (mil) | % Transmittance | % Haze | % Clarity | % Gloss |
|---|---|---|---|---|---|---|
| E-VCH/A | 140 | 11 | 92.8 | 9.7 | 83.9 | 64 |
| E-VCH/B | 140 | 5 | 93.3 | 7.34 | 95.7 | 63 |
| E-VCH/C | 130 | 8 | 94.5 | 14.2 | 79.8 | 57 |
| E-VCH/D | 150 | 10 | 93.2 | 67.2 | 78.3 | 43 |
| E-VCH/E | 130 | 12 | 93.9 | 47.7 | 90.6 | 49 |

EXAMPLE XXI

A series of semi-crystalline copolymers of ethylene and vinyl cyclohexene were made, as described below. Each of the copolymer products were analyzed for its melt temperature (Tm) and melt flow index (I$_2$) as well as being pressed into films to determine their physical properties. The results are given in the table below. These are compared to a linear low density polyethylene which has a higher melt temperature of about 122° C.

Preparation of E-VCH Copolymer 1

A polymerization was conducted according to Example 1 except that the polymerization was done at 50° C., 5 psig ethylene using 88 g of VCH, 510 g of toluene containing 0.1 wt % Al (from MAO). The polymerization was commenced by injection of 2 mg of racemic-ethylenebis(indenyl) zirconium(IV)dichloride (Catalyst A) dissolved in 10 mL of toluene. The polymerization was allowed to proceed for 150 min and 115 g of a semicrystalline polymer was isolated. The resultant E-VCH copolymer had melting temperature of 69° C., a I$_2$ of 4.6 dg/min. The copolymer was found to have a density of 0.936 g/cm$^3$ and contain 10 mole % VCH as determined by $^{13}$C NMR.

Preparation of E-VCH Copolymer 2

A polymerization was conducted according to Example 1 except that the polymerization was done at 50° C., 5 psig ethylene using 119 g of VCH, 510 g of toluene containing 0.1 wt % Al (from MAO). The polymerization was commenced by injection of 2 mg of racemic-ethylenebis (indenyl)zirconium(IV)dichloride (Catalyst A) dissolved in 5 mL of toluene. The polymerization was allowed to proceed for 110 min and 78 g of a semicrystalline polymer was isolated. The resultant E-VCH copolymer had melting temperature of 78° C., a I$_2$ of 0.029 dg/min and an I$_{10}$/I$_2$ of 17.8. The copolymer was found to have a density of 0.930 g/cm$^3$ and contain 9 mole % VCH as determined by $^{13}$C NMR.

Preparation of E-VCH Copolymer 3

A polymerization was conducted according to Example 1 except that the polymerization was done at 50° C., 5 psig ethylene using 77 g of VCH, 530 g of toluene containing 0.1 wt % Al (from MAO). The polymerization was commenced by injection of 2 mg of racemic-ethylenebis(indenyl) zirconium(IV)dichloride (Catalyst A) dissolved in 5 mL of toluene. The polymerization was allowed to proceed for 112 min and 76 g of a semicrystalline polymer was isolated. The resultant E-VCH copolymer had melting temperature of 83° C., a I$_2$ of 0.176 dg/min and an I$_{10}$/I$_2$ of 21.7. The copolymer was found to have a density of 0.929 g/cm$^3$ and contain 8 mole % VCH as determined by $^{13}$C NMR.

Preparation of E-VCH Copolymer 4

A polymerization was conducted according to Example 1 except that the polymerization was done at 50° C., 5 psig ethylene using 102 g of VCH, 260 g of toluene containing 0.1 wt % Al (from MAO). The polymerization was commenced by injection of 1 mg of racemic-ethylenebis (indenyl)zirconium(IV)dichloride (Catalyst A) dissolved in 20 mL of toluene. The polymerization was allowed to proceed for 43 min and 25 g of a semicrystalline polymer was isolated. The resultant E-VCH copolymer had melting temperature of 90° C., a $I_2$ of 0.85 dg/min and an $I_{10}/I_2$ of 12.1. The copolymer was found to have a density of 0.943 g/cm³.

Preparation of E-VCH Copolymer 5

A polymerization was conducted according to Example 1 except that the polymerization was done at 50° C., 5 psig ethylene using 36 g of VCH, 530 g of toluene containing 0.1 wt % Al (from MAO). The polymerization was commenced by injection of 2 mg of racemic-ethylenebis(indenyl) zirconium(IV)dichloride (Catalyst A) dissolved in 5 mL of toluene. The polymerization was allowed to proceed for 90 min and 81 g of a semicrystalline polymer was isolated. The resultant E-VCH copolymer had melting temperature of 103° C., a $I_2$ of 0.013 dg/min and an $I_{10}/I_2$ of 18.7. The copolymer was found to have a density of 0.930 g/cm³ and contain 4 mole % VCH as determined by $^{13}$C NMR.

EXAMPLE XXII

Tensile and Elongation Results

Samples of E-VCH which varied in VCH content were tested for tensile strength, ultimate elongation and Young's modulus and compared to a LLDPE (Table 9). As expected the Young's modulus increased as the degree of crystallinity increased. The lower tensile strength and elongation to break resulted in an overall reduction in the toughness (area under the stress/strain T&E curve) of the resin. It should be pointed out however that LLDPE has a higher melt temperature and, therefore, is expected to be tough. The tensile and elongation results of E-VCH are good and suggest that they are useful as a film layer material. The physical strength coupled with its inherent crosslink ability (potentially at low electron-beam doses) may however be used advantageously in structures which are exposed to lower doses of radiation, especially to obtain grease resistance for instance.

TABLE 9

Summary of Tensile Properties of Ethylene-Vinylcyclohexene Copolymers

| Reference Polymer | $T_m{}^a$ (° C.) | $I_2{}^b$ (dg/min) | Mol % VCH (by NMR) | Young's Modulus$^c$ (psi) | Tensile Strength$^d$ (psi) | Ultimate Elongation$^d$ (%) | Toughness$^d$ (in - #/in³) |
|---|---|---|---|---|---|---|---|
| 1 | 69 | 4.6 | 10 | 5631$^f$ ± 321 | 3050$^g$ ± 460 | 750$^g$ ± 100 | 8451$^g$ ± 989 |
| 2 | 78 | 0.03 | 9 | 3700 ± 110 | 4200 ± 330 | 586 ± 10 | 7800 ± 360 |
| 3 | 83 | 0.18 | 8 | 5800 ± 114 | 4472 ± 285 | 636 ± 12 | 9700 ± 505 |
| 4 | 90 | 0.85 | nd | 8600 ± 236 | 5300 ± 924 | 583 ± 45 | 11100 ± 1232 |
| 5 | 103 | 0.01 | 4 | 18900 ± 814 | 3500 ± 806 | 470 ± 51 | 9200 ± 1770 |
| LLDPE$^e$ (12 mils) | nd | 1.0 | 1.7 (O) | 51600 ± 4434 | 5175 ± 353 | 735 ± 22 | 17160 ± 1194 |
| LLDPE$^e$ (20 mils) | nd | 1.0 | 1.7 (O) | 48110 ± 1215 | 5060 ± 222 | 748 ± 16 | 17120 ± 749 |
| LLDPE$^e$ (30 mils) | nd | 1.0 | 1.7 (O) | 47390 ± 787 | 4954 ± 278 | 747 ± 23 | 16830 ± 1021 |

$^a$Melting temperature from DSC @ 10° C./min;
$^b$Melt flow index @ 190° C. and 2.16 kg;
$^c$Young's Modulus measured with a crosshead speed of 0.5 in/min;
$^d$Tensile properties measured with a crosshead speed of 10 in/min with toughness taken as the area under the stress/strain curve using test specimens which were 15–30 mils thick;
$^e$Linear-low density polyethylene, 0.920 g/cc, Dowlex 2045.03 (Dow).
$^f$Young's Modulus measured with a crosshead speed of 1.0 in/min;
$^g$Tensile properties measured with a crosshead speed of 5 in/min with toughness taken as the area under the stress/strain curve.

EXAMPLE XXIII (Oriented Monolayer Film of an LCB Ethylene-Vinylcyclohexene Copolymer)

Hot-pressed films of an EVCH copolymer having about 2 mole percent VCH, of approximate dimensions 0.020 inch× 2.5 inch×2.5 inch, are prepared and stretched on a laboratory biaxial orientation apparatus (TM Long Company). By an analogous procedure, hot-pressed films of 0.918 g/cm³ heterogeneous linear low density polyethylene (Dow, Dowlex 2045.03), approximate dimensions 0.014 inch×2.5 inch×2.5 inch are prepared and stretched. The selection of the (LLDPE) as a reference sample is based on its similarity in its Vicat softening temperature relative to the EVCH copolymer. The stretching conditions for each of the pressed films are as follows:

| Mode of Stretch | Simultaneous biaxially at 3x3 |
| During Stretch | 185° F. (85° C.) |
| Stretch Rate | 2 and 20 inches per second |

After stretching, all films are cooled with ambient air, removed from the apparatus, and held at about 73° C. for at least two days before testing. Tensile modulus (ASTM D882-91, Method A) and free shrink properties are tested along each of the two orthogonal stretching directions on the film samples, and the values are averaged. Impact strength is determined according to ASTM D3763-86. The EVCH film exhibits superior tensile, free shrink and impact properties.

EXAMPLE XXIV (Oriented Monolayer film of an LCB Ethylene/Vinycyclohexene Copolymer)

Hot-pressed films of an ethylene-vinylcyclohexene copolymer having about 3 mole percent VCH, of approximate dimensions 0.020 inch×2.5 inch×2.5 inch, are prepared and stretched on a laboratory biaxial orientation apparatus (TM Long Company). By an analogous procedure, hot-pressed films of a very low density polyethylene (0.905 g/cm$^3$; Dow Attane 4203) VLDPE of approximate dimensions 0.014 inch×2.5 inch×2.5 inch are prepared and stretched. The reference sample is chosen based on its similar Vicat softening temperature relative to the ethylene-vinylcyclohexene copolymer sample. The stretching conditions for each of the pressed films are as follows:

| | |
|---|---|
| Mode of Stretch | Simultaneous biaxially at 3x3 |
| During Stretch | 185° F. (85° C.) |
| Stretch Rate | 2 and 20 inches per second |

After stretching, all films are cooled with ambient air, removed from the apparatus, and held at about 73° C. for at least two days before testing. Tensile modulus (ASTM D882-91, Method A) and free shrink properties are tested along each of the two orthogonal stretching directions on the film samples, and the values are averaged. Impact strength is determined according to ASTM D3763-86. The EVCH film exhibits superior tensile, free shrink and impact properties.

EXAMPLE XXV (Oriented Monolayer film of an LCB Ethylene/Vinylcyclohexene Copolymer)

Hot-pressed films of an ethylene-vinylcyclohexene copolymer having 5 mole percent VCH of approximate dimensions 0.020 inch×2.5 inch×2.5 inch, are prepared and stretched on a laboratory biaxial orientation apparatus (TM Long Company). By an analogous procedure, hot-pressed films of a homogeneous ethylene-octene copolymer (sample EAO, 0.901 g/cm3 by ASTM D 1505), approximate dimensions 0.014 inch×2.5 inch×2.5 inch are prepared and stretched. The selection of EAO as a reference sample is based on its high level of toughness relative to other ethylene-1-olefin copolymers along with its similar Vicat softening temperature (about 90° C.) relative to the ethylene-vinylcyclohexene copolymer sample EVCH (about 91° C.). The stretching conditions for each of the pressed films are as follows:

| | |
|---|---|
| Mode of Stretch | Simultaneous biaxially at 3x3 |
| During Stretch | 185° F. (85° C.) |
| Stretch Rate | 2 and 20 inches per second |

After stretching, all films are cooled with ambient air, removed from the apparatus, and held at about 73° C. for at least two days before testing. Tensile modulus (ASTM D882-91, Method A) and free shrink properties are tested along each of the two orthogonal stretching directions on the film samples, and the values are averaged. Impact strength is determined according to ASTM D3763-86. The EVCH film exhibits superior tensile, free shrink and impact properties.

EXAMPLE XXVI (Hot Air Orientation of a Multilayer Film Containing Propylene/Ethylene Copolymer and LCB Ethylene/Vinylcyclohexene Copolymer)

A palindromic three-layer, coextruded film having an A/B/A astructure is oriented out of hot air at 115° C. The outer "A" layers are propylene/ethylene copolymer having 3 wt. % ethylene. The inner "B" layer is EVCH described in Example XI above. The relative thicknesses of the A/B/A layers are in the ratio of 1/2/1, respectively. The film exhibits good extrusion processability and has good peel strength.

EXAMPLE XXVII (Hot Air Orientation of a Multilayer Film Containing Propylene Homopolymer and Ethylene/Vinylcyclohexene Copolymer)

A palindromic three-layer, coextruded film having an A/B/A astructure is oriented out of hot air at 115° C. The outer "A" layers are propylene homopolymer. The inner "B" layer an EVCH copolymer having 19 mole percent VCH and long chain branched structure. The relative thicknesses of the A/B/A layers are in the ratio of 1/2/1, respectively. The film exhibits good extrusion processability and peel strength of the resultant film.

EXAMPLES 27–33

Seven films are made by, in each case, coextruding a multilayer substrate, then exposing the substrate to an electron beam at an absorbed dosage of 4.5 megarads to induce crosslinking in the film, and thereafter extrusion-coating two or more additional layers on to the substrate, by simultaneous or sequential extrusion coating. Each film is then oriented out of hot water, via a trapped bubble method, with both preheat and hot bath temperatures in the range of 185° F. to 205° F. The composition and structure of each film is given in Table 11, where all layers left of the double slashes (//) are electronically crosslinked.

TABLE 10

Identification of Polymers

| Resin | Description | Supplier Name | Trade Name |
|---|---|---|---|
| EVA #1 | Poly(ethylene-co-vinyl acetate) 8.9 wt % VA | Dupont | ELVAX 2128 |
| EVA #2 | Poly(ethylene-co-vinyl acetate) 9 wt % VA | Exxon | Escorene LD 318.92 |
| EVA #3 | Poly(ethylene-co-vinyl acetate) 19 wt % VA | Exxon | Escorene LD-720.92 |
| EVA #4 | Poly(ethylene-co-vinyl acetate) 3.3 wt % VA | Rexene | PE 1335 |
| EVA #5 | Poly(ethylene-co-vinyl acetate) 3.5 wt % VA | | |
| EVCH #1 | Poly(ethylene-co-vinyl-cyclohexene) 2 mole % VCH | | |
| EVCH #2 | Poly(ethylene-co-vinyl-cyclohexene) 3 mole % VCH | | |
| EVCH #3 | Poly(ethylene-co-vinyl-cyclohexene) 4 mole % VCH | | |
| EVCH #4 | Poly(ethylene-co-vinyl-cyclohexene) 5 mole % VCH | | |
| EVCH #5 | Poly(ethylene-co-vinyl-cyclohexene) 6 mole % VCH | | |
| EVCH #6 | Poly(ethylene-co-vinyl-cyclohexene) 7 mole % VCH | | |
| EVCH #7 | Poly(ethylene-co-vinyl-cyclohexene) 9 mole % VCH | | |

TABLE 10-continued

Identification of Polymers

| Resin | Description | Supplier Name | Trade Name |
|---|---|---|---|
| EVCH #8 | Poly(ethylene-co-vinyl-cyclohexene) 19 mole % VCH | | |
| EVCH #9 | Poly(ethyiene-co-vinyl-cyclohexene) 25 mole % VCH | | |
| EVCH #10 | Poly(ethylene-co-vinyl-cyclohexene) 30 mole % VCH | | |
| EVCH #11 | Poly(ethylene-co-vinyl-cyclohexene) 35 mole % VCH | | |
| EAOC #1 | 0.901 g/cm$^3$ homogeneous poly(ethylene-co-1octene) | Dow | DPF 1150.01 |
| EAOC #2 | 0.905 g/cm$^3$ heterogeneous (VLDPE) poly(ethylene-co-1-octene) | Dow | Attane ® 4203 |
| EAOC #3 | 0.918 g/cm$^3$ heterogeneous (LLDPE) poly(ethylene-co-1-octene) | Dow | DOWLEX ® 2045.03 |
| VDCMA | Poly(vinylidene chloride-co-methyl acrylate) | Dow | SARAN MA134 |
| EVOH | Ethylene-vinyl alcohol | Evalca | Eval |
| PEC | Propylene/ethylene copolymer (3 wt % ethylene) | | |
| PP | Propylene homopolymer | | |
| VDCMA | vinylidene chloride/methyl acrylate copolymer | Dow | Saran |
| ah-PO | anhydride-modified polyolefin | | |
| N6 | nylon 6 (polycaprolactam) | | |
| I | ionomer | | |
| CP | copolyester | | |

TABLE 11

| Example | Film Structure |
|---|---|
| 27 | EVA#1/EVCH#3//VDCMA/EVA#2 |
| 28 | EVA#1/EVCH#3//VDCMA/EVCH#3 |
| 29 | EVA#1/EVCH#3//VDCMA/EVCH#3/EVA#2 |
| 30 | EVA#1/EVCH#3/EVA#3//VDCMA/EVCH#3/EVA#2 |
| 31 | EVA#1/EVCH#3/EVA#3//EVA#3/VDCMA/EVCH#3/EVA#2 |
| 32 | EVA#1/EVCH#3/EVA#31/EVCH#8/VDCMA/EVCH#3/EVA#2 |
| 33 | EVCH#7/EVA#3//VDCMA/EVA#2 |

EXAMPLES 34 to 41

Eight films are made by, in each case, coextruding multiple layers and then Bially orienting the coextruded film out of hot air at a temperature of between 113° C. and 115° C./ The composition and structure of each film is given in Table 12.

TABLE 12

| Example | Film Structure |
|---|---|
| 34 | EVCH#5/EVA#4/EVCH#5 |
| 35 | 50% EVCH#5+50% EVA#3/EVOH/50% EVCH#5 + 50% EVCH#3 |
| 36 | EVA#2/EVCH#8*/EVOH/EVCH#8*/EVA#2 |
| 37 | EVCH#1/EVA#3/EVOH/EVA#3/EVCH#1 |
| 38 | EVCH#1/EVA#3/N6/EVOH/N6/EVA#3/EVCH#1 |
| 39 | EVCH#1/EVCH#8*/N6/EVOH/N6/EVCH#8*/EVCH#1 |
| 40 | EAOC#2/EVA#5/ah-PO/EVOH/ah-PO/EVA#5/EVCH#4 |
| 41 | EAOC#2/EVA#5/EVCH#7*/EVOH/EVCH#7*/EVA#5/EVCH#4 |

*= includes 2%, by weight of the resin, of chemically grafted maleic anhydride.

EXAMPLE 42

The multilayer film of Examples 26 through 30 is adhered in each case to a foamed polystyrene web, using heat and pressure. Outer layer #2 (the polymer recited for the layer at the extreme right of the structures of Examples 26 through 30 of Table 8) bonds directly to the foamed polystyrene web. The foamed polystyrene with the multilayer film laminated thereto is thereafter thermoformed into a tray.

EXAMPLE 43

A five-layer multilayer film is coextruded and quenched. The multilayer film has a first layer of an ethylene/vinyl acetate copolymer; a second layer of a metal neutralized salt of an ethylene/acrylic acid copolymer (i.e., ionomer); a third layer of an ethylene/vinyl acetate copolymer; a fourth layer of EVCH #10; and a fifth layer of polystyrene.

EXAMPLE 44

The five-layer multilayer film of Example 43 is adhered to a metallized polyester web with an adhesive. The resultant laminate structure is thermoformed into a tray.

EXAMPLE 45

An eight-layer film is coextruded as a multilayer film, followed by quenching. The eight-layer film has the structure:

EVA#1/I/EVA#1/adhesive/EVOH/adhesive/EVCH #9/polystyrene

The film is thermoformed into a tray.

EXAMPLE 46

A two-layer film, in the form of a tube, is coextruded. The two-layer film has a first layer (the inside layer of the tube) of an ethylene/vinyl acetate copolymer having 25% vinyl acetate by weight of the copolymer, and a second layer (the outside layer of the tube) of a blend of 50 weight percent of EVCH #6, and 50 weight percent of an ethylene/vinyl acetate copolymer having 8% vinyl acetate. The tube is irradiated and then oriented out of hot air. Following orientation the tube is collapsed and flattened such that the first layer adheres to itself, thereby forming the tube into a four layer film.

EXAMPLES 47 to 49

Three films are each made by downward cast coextrusion. The structures of the films appear in Table 12. After coextrusion, each film is converted into a pouch suitable for use in medical applications. During the conversion to the pouch structure, the film of Examples 36 to 38 is radio frequency (RF) sealed, with the fourth layer (to the extreme right in the Table) being a sealing layer, and the third layer being a susceptor layer.

TABLE 13

| Example | Film Structure |
|---|---|
| 47 | PEC/adhesive/EVCH#9* */PEC |
| 48 | CP/adhesive/EAOC#2/adhesive/EVCH#10 |
| 49 | CP/adhesive/50% EVCH #11 + 50% EVA#3/PEC |

** = partially oxidized.

EXAMPLE 50

A seven layer barrier film comprising any of the films of Examples 38 through 41 is laminated with an isocyanate adhesive to an 8-mil sheet of an ethylene/vinylcyclohexene copolymer incorporating at least 35 mole % vinylcyclohexene. The resulting laminate is thermoformed to yield a thermoformed web suitable for vacuum-skin packaging applications.

The adhesive of Examples 44, 45, and 46 to 48 can be of any suitable composition and type, and can be, e.g., a polyurethane adhesive, an isocyanate adhesive, or an anhydride-grafted polyolefin such as those sold by DuPont under the Bynel® mark, by Mitsui under the Admer® mark, by Millenium under the Plexaar® mark, etc. These are typically characterized by the presence of a maleic anhydride or other anhydride functionality.

EXAMPLE 51

Interfacial bond strengths were determined for a series of films formed from copolymers of Examples XV, XVI and XVII above and polyvinylidene dichloride copolymers (PVDC). In addition, for comparative purposes, the interfacial bond strnegth between linear low density polyethylene (LLDPE) film (Dowlex 2045 of Dow Chemical Co.) and polyvinylidene dichloride was conducted. All tests were done according to the procedure of ASTM F-904.91. The films were laminated at 35.4 psi at 300° F. for 1 minute and then stored according to the procedure ASTM D-1928A. The results are given in Table 13 below and show that copolymers of the present invention provide stronger interfacial bond strength than the conventional packaging polymer, LLDPE. Further, the results show that even small amounts of vinyl cyclohexene provides enhanced strengths.

TABLE 14

| Sample | Mole %<br>4-VCH | Peel Energy<br>(lb/in) | Peel Force<br>16-in × 10² |
|---|---|---|---|
| PVDC/LLDPE | — | 0.12 | 5.3 |
| PVDC/Ex. | 4.3 | 0.17 | 5.3 |
| PVDC/Ex. | 5.9 | 0.46 | 15.3 |
| PVDC/Ex. | 7.8 | 0.69 | 21.2 |

What is claimed is:

1. A polymer product composed of a copolymer having long chain branches, said copolymer comprising units derived from monomers of (i) ethylene and (ii) at least 1 mole percent of said copolymer composed of at least one vinyl alicyclic monomer represented by the formula:

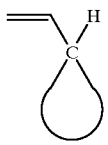

wherein

represents an unsubstituted or $C_1$–$C_{12}$ hydrocarbyl substituted $C_5$–$C_{12}$ saturated alicyclic group or an unsubstituted or $C_1$–$C_{12}$ hydrocarbyl substituted $C_6$–$C_{12}$ alicyclic group having at least one non-aromatic, ethylenic unsaturation; and
   said copolymer has a polydispersity (Mw/Mn) of from at least about 1.5 to about 5 and a melt flow index ratio ($I_{10}/I_2$) of at least about 8.

2. The polymer product of claim 1 wherein the copolymer units derived from ethylene composes from 0.1 to 99 mole percent of the copolymer.

3. The polymer product of claim 1 or 2 wherein the copolymer units derived from said at least one vinyl alicyclic monomer is present in from about 1 to about 25 molar percent of the copolymer.

4. The polymer product of claim 3 wherein

represents a $C_5$–$C_{12}$ saturated alicyclic group.

5. The polymer product of claim 3 wherein

represents a $C_6$–$C_{12}$ alicyclic group having at least one non-aromatic, ethylenic unsaturation.

6. The polymer product of claim 3 wherein the copolymer units derived from said vinyl alicyclic monomer comprises vinyl cyclohexene.

7. The polymer product of claim 1 wherein the copolymer units derived from said vinyl alicyclic monomer comprises vinyl cyclohexene.

8. The polymer product of claim 1 wherein the copolymer has a polydispersity (Mw/Mn) of from about 1.7 to about 4 and a melt flow index ration ($I_{10}/I_2$) of at least about 8.5.

9. The polymer product of claim 1 wherein the copolymer has a polydispersity (Mw/Mn) of from about 1.9 to about 3 and a melt flow index ratio ($I_{10}/I_2$) of at least about 10.

10. The polymer of claim 1, 2, 8 or 9 wherein the copolymer further comprises units derived from at least one third monomer having at least one ethylenic unsaturation group capable of forming copolymers with monomers (i) and (ii).

11. The polymer of claim 3 wherein the copolymer further comprises units derived from at least one third monomer having at least one ethylenic unsaturation group capable of forming copolymers with monomers (i) and (ii).

12. The polymer of claim 4 wherein the copolymer further comprises units derived from at least one third monomer having at least one ethylenic unsaturation group capable of forming copolymers with monomers (i) and (ii).

13. The polymer of claim 5 wherein the copolymer further comprises units derived from at least one third monomer having at least one ethylenic unsaturation group capable of forming copolymers with monomers (i) and (ii).

14. The polymer of claim 6 wherein the copolymer further comprises units derived from at least one third monomer having at least one ethylenic unsaturation group capable of forming copolymers with monomers (i) and (ii).

15. The polymer of claim 7 wherein the copolymer further comprises units derived from at least one third monomer having at least one ethylenic unsaturation group capable of forming copolymers with monomers (i) and (ii).

16. The polymer of claim 10 wherein the third monomer is selected from $C_3$–$C_{20}$ alpha-olefins.

17. The polymer of claim 15 wherein the third monomer is selected from $C_3$–$C_{20}$ alpha-olefins.

18. A packaging material in the form of a rigid article, semi-rigid article or film comprising at least one layer, wherein at least one of said layer comprises a copolymer having long chain branches, said copolymer comprising units derived from monomers of (i) ethylene and (ii) at least one mole percent of said copolymer composed of at least one vinyl alicyclic monomer represented by the formula:

wherein

represents an unsubstituted or $C_1$–$C_2$ hydrocarbyl substituted $C_5$–$C_{12}$ saturated alicyclic group or an unsubstituted or $C_1$–$C_{12}$ hydrocarbyl substituted $C_6$–$C_{12}$ alicyclic group having at least one non-aromatic, ethylenic unsaturation; and said copolymer has a polydispersity (Mw/Mn) of from at least about 1.5 to about 5 and a melt flow index ratio ($I_{10}/I_2$) of at least about 8.

19. A packaging material of claim 18 wherein the copolymer units derived from said at least one vinyl alicyclic monomer is present in from about 1 to about 25 molar percent of the copolymer.

20. A packaging material of claim 19 wherein

represents a $C_5$–$C_{12}$ saturated alicyclic group.

21. A packaging material of claim 19 wherein

represents $C_6$–$C_{12}$ alicyclic group having at least one non-aromatic, ethylenic unsaturation.

22. A packaging material of claim 18 wherein the copolymer units derived from said vinyl alicyclic monomer comprises vinyl cyclohexene.

23. A packaging material of claim 19 wherein the copolymer units derived from said vinyl alicyclic monomer comprises vinyl cyclohexene.

24. The packaging material of claim 18 wherein the copolymer units derived from ethylene composes from 0.1 to 99 mole percent of the copolymer.

25. The packaging material of claim 18 wherein the copolymer has a polydispersity (Mw/Mn) of from about 1.7 to about 4 and a melt flow index ratio ($I_{10}/I_2$) of at least about 8.5.

26. The packaging material of claim 18 wherein the copolymer has a polydispersity (Mw/Mn) of from about 1.9 to about 4 and a melt flow index ratio ($I_{10}/I_2$) of at least about 10.

27. A packaging material of claim 18, 24, 25 or 26 wherein the copolymer further comprises units derived from at least one third monomer having at least one ethylenic unsaturation group capable of forming copolymers with monomers (i) and (ii).

28. A packaging material in the form of a rigid article, semi-rigid article or film comprising at least one layer, wherein at least one of said layer comprises the long chain branched copolymer of claim 16.

29. A packaging material in the form of a rigid article, semi-rigid article or film comprising at least one layer, wherein at least one of said layer comprises the long chain branched copolymer of claim 17.

30. The packaging material of claim 18 wherein said at least one layer comprising the long chain branched copolymer is comprised of a blend of said copolymer and at least one additional polymer selected from the group consisting essentially of polyolefins, polyethylene terephthalate, polyvinyl chloride, polyvinylidene chloride, polyethylene copolymers and mixtures thereof.

31. The packaging material of claim 30 wherein aid additional polymer comprises at least one polyolefin.

32. The packaging material of claim 18 wherein the packaging material is a flexible film having a thickness of from 5 to 250 micrometers.

33. The packaging material of claim 28 wherein the packaging material is a flexible film having a thickness of from 5 to 250 micrometers.

34. The packaging material of claim 30 wherein the packaging material is a flexible film having a thickness of from 5 to 250 micrometers.

35. The packaging material of claim 18 in the form of a film.

36. The packaginig material of claim 35 wherein the film further comprises an additional polymeric layer.

37. The packaging material of claim 35 wherein at least one layer of the film is crosslinked.

38. The packaging material of claim 35 wherein the layer comprising the long chain branched copolymer of claim 41 is disposed between a heat sealable layer and another polymeric layer.

39. The packaginig material of claim 35 wherein the film further comprises an oxygen barrier layer.

40. The packaging material of claim 35 wherein the film further comprises an adhesive layer.

41. The packaging material of claim 35 wherein at least one layer comprises a blend of the long chain branched copolymer and a second polymer.

42. The packaging material of claim 41 wherein the second polymer is selected from the group consisting of polyethylene, ethylene/olefin copolymer, propylene/olefin copolymer, polypropylene, ethylene/vinyl acid copolymer, and ethylene/vinyl ester copolymer.

43. The packaging material of claim 35 wherein the film is oriented.

44. The packaging material of claim 35 wherein the film is heat shrinkable.

45. A package comprising an article, and a film wrapped around the article, the film comprising the film of claim 35.

* * * * *